(12) United States Patent
Garrett et al.

(10) Patent No.: US 6,408,640 B1
(45) Date of Patent: Jun. 25, 2002

(54) CRYOGENIC REFRIGERATION OF GOODS

(75) Inventors: Michael Ernest Garrett, Woking; Michael John Heywood, Hythe, both of (GB)

(73) Assignee: The BOC Group, plc, Windlesham (GB)

(*) Notice: Subject to any disclaimer, the term of this patent is extended or adjusted under 35 U.S.C. 154(b) by 0 days.

(21) Appl. No.: 09/583,491

(22) Filed: May 31, 2000

(30) Foreign Application Priority Data

Jun. 4, 1999 (GB) .............................................. 9913071

(51) Int. Cl.[7] .............................................. F25D 17/02
(52) U.S. Cl. .............................. 62/373; 62/51.1; 62/239
(58) Field of Search .............................. 62/50.1, 48.1, 62/62, 239, 373

(56) References Cited

U.S. PATENT DOCUMENTS

| | | | |
|---|---|---|---|
| 3,925,048 A | * 12/1975 | Iung | .......................... 62/50.1 |
| 4,561,258 A | 12/1985 | Broderick | |
| 5,335,503 A | * 8/1994 | Lee | .............................. 62/239 |
| 5,385,025 A | * 1/1995 | Kellett | ........................ 62/50.1 |
| 5,729,983 A | 3/1998 | Tomlins | |

FOREIGN PATENT DOCUMENTS

| | | |
|---|---|---|
| EP | 0586294 | 3/1994 |
| EP | 0816781 | 1/1998 |

* cited by examiner

Primary Examiner—Ronald Capossela
(74) Attorney, Agent, or Firm—Joshua L. Cohen; Salvatore P. Pace

(57) ABSTRACT

An apparatus for refrigerating goods in a container storing a cryogenic fluid and means for discharging the fluid into the container in order to reduce the temperature therein, characterized in that the storing means is adapted to operate at atmospheric pressures but not at pressures substantially greater than atmospheric. Such a system provides a single and inexpensive means for refrigerating goods in a transportable container, which may be divisible into smaller compartments, and may also be provided with eutectic plates to act as a thermal "buffer" whenever the container/a compartment is opened for loading/unloading.

10 Claims, 2 Drawing Sheets

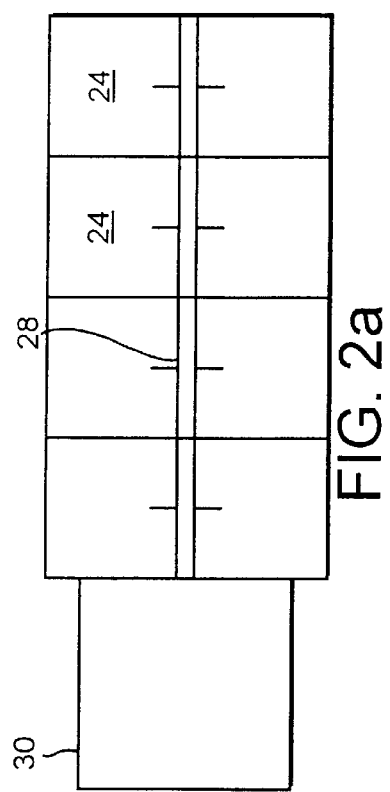
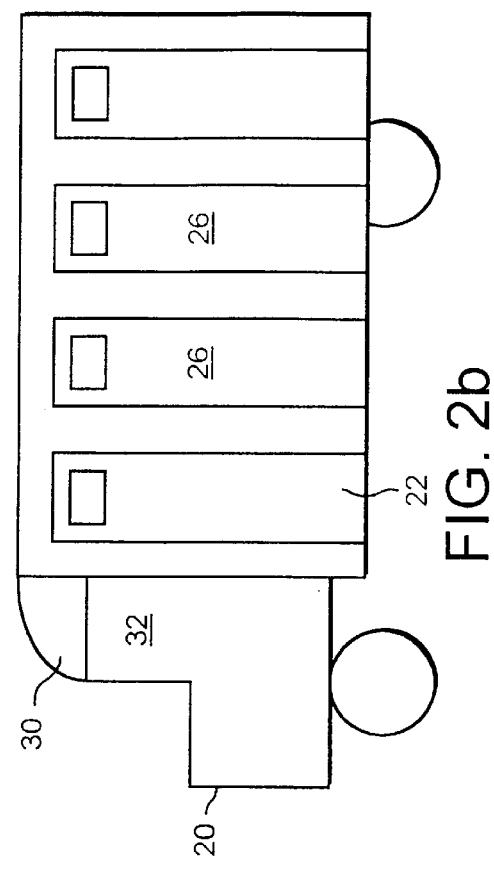
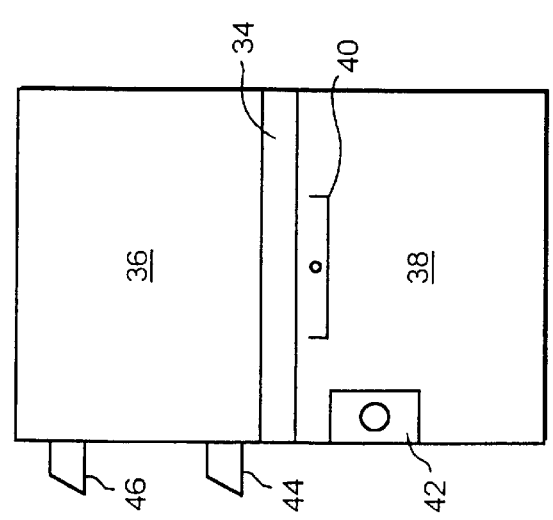

CRYOGENIC REFRIGERATION OF GOODS

BACKGROUND OF THE INVENTION

This invention relates to the cryogenic refrigeration of goods, particularly but not exclusively to the cryogenic refrigeration of goods in transit, and to an apparatus for refrigerating goods in a transportable container.

Known cryogenic refrigeration systems, for transporting perishable foodstuffs and the like, comprise heavily insulated liquid storage tanks which are capable of holding liquid cryogen at several atmospheres pressure. A distribution system is provided which utilises the pressure within the storage tank to generate a spray of cryogen within a container to reduce the temperature within the container, and that of any perishable goods therein. These systems are common in vehicular refrigerated trailers, or reefers, either instead of a or in combination with a mechanical refrigeration unit.

Such conventional cryogenic refrigeration systems are complex and expensive to maintain and operate properly, and there is a need for a more efficient way of utilising a cryogenic liquid for refrigeration of goods in transit without loss of refrigeration performance.

SUMMARY OF THE INVENTION

Accordingly, the present invention provides an apparatus for refrigerating goods in a container having means for storing a cryogenic fluid and means for discharging the fluid into the container in order to reduce the temperature therein, characterised in that the storing means is adapted to operate at atmospheric pressures but not at pressures substantially greater than atmospheric.

Such an arrangement, which can be embodied in a relatively simple and inexpensive liquid storage tank formed substantially of a foamed polymeric material, such as polystyrene, is more easily and safely operated than conventional cryogenic systems. Because the storage tank need only be capable of containing a little over atmospheric pressure (which may be assisted by the provision of an appropriately set pressure relief valve), the amount of cryogen it contains can be quickly gauged, with a suitable weight sensor, for example, and the problem of assessing how much of the cryogen is in the liquid state and how much in the gaseous state encountered in conventional systems is immaterial. So, operators of apparatus in accordance with the invention need less expensive training.

The delivery of the cryogenic fluid from the storage tank to the thermally insulated container for discharging onto the refrigerated goods may conveniently be effected by gravity. In a typical lorry or truck mounted system this can be achieved by mounting the storage means on top of the driver's cab. Additionally or alternatively a pump may be provided to deliver the cryogenic fluid, however this may be disadvantageous as such a pump would require a separate power supply. Because the cryogenic fluid pressures in both the storage tank and the delivery lines from the storage tank to the discharge means are substantially atmospheric, these lines can be made inexpensively of plastics material, or of much thinner insulated metal than those of conventional, high pressure systems.

Discharge of the cryogenic fluid into the container may be by way of thermostatically controlled solenoid valves, as is known in the art.

A further problem with conventional cryogenic refrigeration transport systems arises where a simple vehicle is used to make a number of separate deliveries, each of a relatively small amount of refrigerated goods. With conventional "multi-drop" systems there is frequent opening and closing of the insulated container to remove goods, and each time this occurs the refrigeration system is required to bring down the ambient temperature within the entire container, which is clearly inefficient. Therefore, in a further aspect this invention provides an apparatus for refrigerating goods in a transportable container comprising means for storing a cryogenic fluid and means for discharging the fluid into the container in order to reduce the temperature therein, wherein the container is subdivided into a plurality of discrete compartments, a plurality of discharge means being provided each being adapted to discharge cryogenic fluid into a single compartment.

With such an arrangement, when delivering a small load only one or two compartments need be opened and, after emptying of their load, either returned to their proper refrigerated temperature, or allowed to remain at ambient temperature without affecting the other compartments. This aspect of the invention may suitably be used in combination with the first invention described above.

Compartmentalisation of the container may be by simple, thermally-insulated partitions, however provision must be made for external access to each compartment without requiring any other compartment to be opened. This can be achieved by way of a standard sized thermally insulated container, or "box body", with a plurality of small doors each opening into a separate compartment. The provision of a plurality of compartments is also useful as they preferably have separate thermostatic control means for discharging cryogen for refrigeration; preferably these control means may be set to operate at different temperatures, meaning that different temperature regimes may be maintained in the different compartments, allowing goods which need to be refrigerated and delivered at different temperatures to be carried and delivered by a single containerised vehicle.

Each compartment in such an apparatus may be partitioned into upper and lower chambers. This is useful not only for further subdividing the space within a container but also enables different temperatures to be maintained very simply in associated chambers. Also, the internal partitioning may be movable, so as to enable the container to be configured into chambers of a range of different volumes.

Cryogenic fluid discharge means may be provided in the lower chamber of each compartment, with associated lower and upper chambers being in fluid communication for gas to flow therebetween. If, with such an arrangement, means are provided to discharge cryogenic fluid into the lower chamber, then this will rapidly chill. As cryogenic liquid in the lower chamber evaporates, low temperature gas (which is usually denser than air) will gradually rise to fill first the lower chamber and then, via suitable vents, to fill the upper chamber. Thus the lower chamber will be refrigerated rapidly whilst the upper chamber will cool more slowly. Providing appropriate vents to atmosphere from each upper and/or lower chamber, and actuating these in an appropriate manner, will allow different temperatures to be maintained in the upper and lower chambers as desired.

Another problem with vehicle refrigeration systems is that they require a means of maintaining refrigeration when the trailer-mounted container is disconnected from the vehicle tractor unit or when the vehicle's engine is switched off. In the past, this has required a relatively costly and inefficient battery unit to be mounted to the trailer, or the provision of a complicated pneumatic control system.

Accordingly, in a third aspect, which may advantageously be combined with the first and second aspects of the invention set out above, the invention may provide an apparatus for refrigerating goods in a transportable thermally-insulated container including means for discharging cryogenic fluid into the container to refrigerate the container and goods therein, and elements having eutectic material configured and dispensed so as to act as a thermal buffer for the container, or for some or all of the separate chambers thereof.

Preferably, the roof and possibly the sides of the container, or of each compartment and/or each chamber, are lined with eutectic plates. These are usually two flat sheets of metal bonded together to form a relatively thin, flat tank which is filled with a eutectic material adapted to absorb and release heat at a constant temperature, preferably below 0° C. (water, for example, has a eutectic temperature of 0° C., at which it melts/solidifies whilst absorbing/releasing heat). Eutectic elements may be used so as to maintain different temperatures in different chambers, so as to allow a variety of different goods to be maintained at different temperatures.

In use, the cryogenic refrigeration system will maintain the refrigerated temperature of the goods within the container; some of the "cold" will also leak into the eutectic plates where it will be stored. Eventually the eutectic plates will have 'stored' as much cold as possible, ie all the material will have been converted from one state (usually liquid) to another (usually solid), and they will then perform an insulation function. When the container is disconnected or the vehicle engine switched off, the cryogenic refrigeration system will no longer function but the eutectic plates will yield cold to keep the container at the derived temperature. Depending on the number of plates and the volume of eutectic material, the duration of this "eutectic refrigeration" can be extended or reduced as required.

The invention will now be described by way of example and with reference to the accompanying drawings.

BRIEF DESCRIPTION OF THE INVENTION

FIGS. 2a, 2b and 2c are, respectively, schematic plan, elevation and detailed elevation views of an apparatus for transporting and cryogenically-refrigerating goods in accordance with the invention in its second aspect.

DETAILED DESCRIPTION OF THE INVENTION

Figure 1:
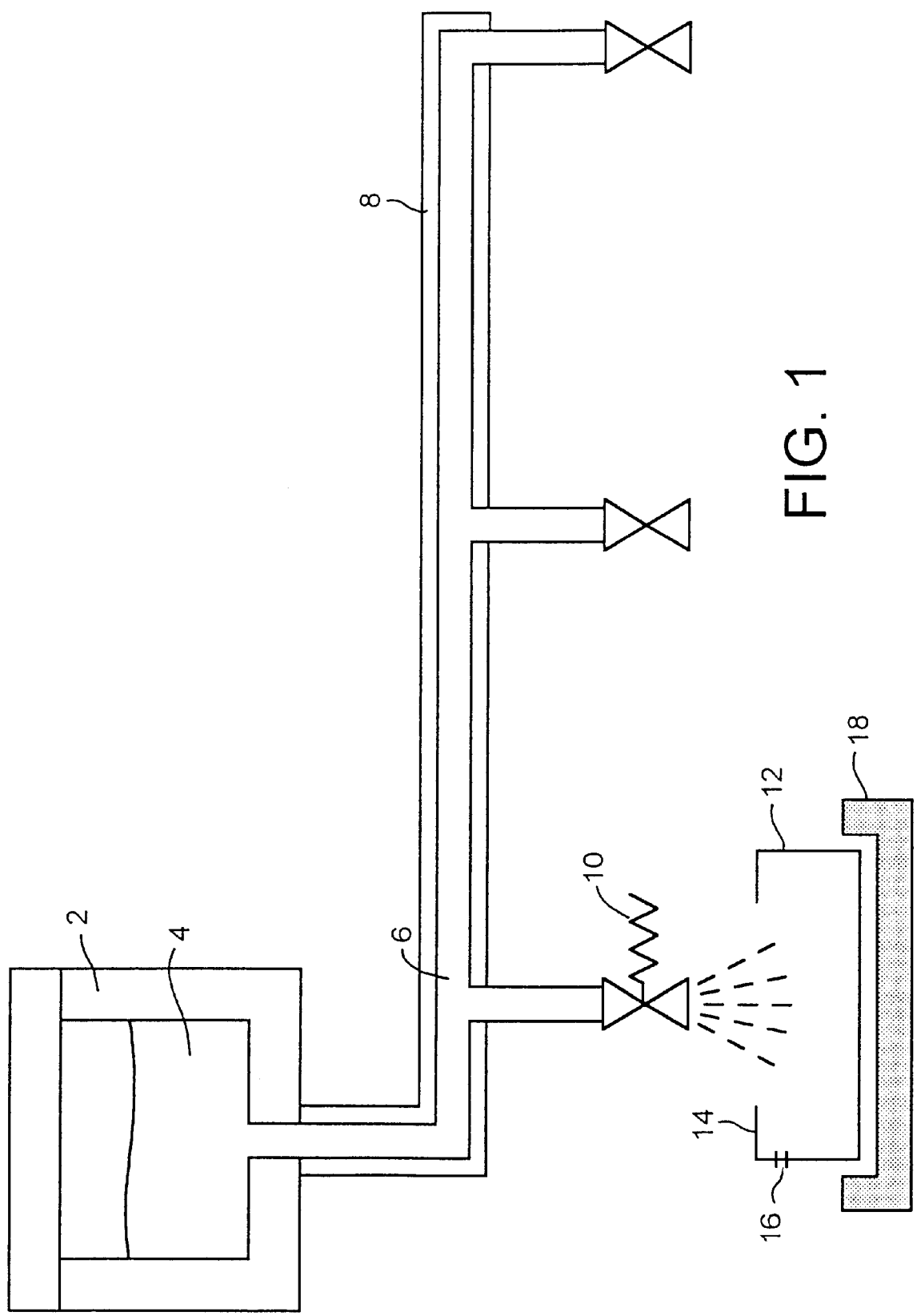
FIG. 1 is a schematic view of an apparatus for cryogenically-refrigerating goods in transit in accordance with the invention in its first aspect.

FIG. 1 shows a storage tank 2 made of foamed plastic holding a cryogenic liquid 4, provided with a distribution line 6 (which is thermally-insulated 8) for cryogenic liquid to flow to a number of thermostatically set solenoid valves 10, adapted on actuation to discharge cryogenic liquid onto an evaporating plate 12 which has an anti-splash lip 14 and perforations 16 (only one shown) in its wall to allow evaporated cryogen to escape. The tank 2 is adapted to hold cryogenic liquid only at pressures equal to or only very slightly above atmospheric, therefore it can be formed substantially of foamed polystyrene, with an outer stiffening layer (not shown) for mechanical strength. To ensure the pressure within the tank 2 remains close to atmospheric, a suitable pressure relief valve (not shown) is provided. The valves 10 and the evaporating plate 12 are located within a thermally-insulated container for transporting goods (not shown), and the arrangement is such that the refrigeration effect resulting from the discharge of cryogenic liquid from the valves, and the subsequent evaporation of the cryogenic liquid, serves to reduce the temperature inside the container as well as that of any goods contained therein. The evaporating plate 12 is shown located above an insulated anti-drip tray 18, which protects any goods or personnel beneath the evaporating plate 12 from splashing with cryogenic liquid. The evaporating plate 12 may be fitted with fins (not shown) to increase the rate of thermal transfer, and hence refrigeration. The storage vessel 2 in use, is disposed higher vertically than the solenoid valves 10 (see FIG. 2b, example) so that the cryogenic liquid flows by gravity from the tank 2 to the valves 10, obviating any requirement for a pump.

Turning now to FIGS. 2a and 2b, a vehicle 20 has a thermally-insulated container body 22 which is divided internally into several thermally-insulated compartments 24, each with its own external door 26. A liquid cryogen distribution network 28 distributes liquid cryogen fed by gravity from a thermally-insulated storage tank 30 made of foamed plastics material to solenoid valves as described above in connection with FIG. 1. The storage tank 30 is mounted above the vehicle cab 32 and above the level of the distribution network 28. The storage tank could alternatively be located elsewhere, provided the liquid cryogen could be fed effectively, such as by means of a standard cryogen pump.

FIG. 2c shows a detail of a single compartment 24, which is subdivided by a tray 34 into upper and lower compartments 36, 38. The cryogen discharge solenoid valve and associated evaporation tray 40 (described above in connection with FIG. 1) are located towards the top of the lower chamber 38, and the discharge of cryogen is actuated by temperature sensor/controller 42 located towards the top of the lower chamber 38. Selectively-closable intermediate and upper vents 44, 46 are provided to vent cryogenic gas to atmosphere. In use, discharge of cryogenic liquid from the solenoid valve 40 immediately cools the lower chamber 38 and, as the discharge continues, evaporated cryogenic liquid (which is usually heavier than air) fills this chamber and moves up through vents (not shown) in the tray 34 to fill the upper chamber, up to the level of one or other vent 44, 46 depending which is open. By selecting which of intermediate and upper vents 44, 46 is closed and which is open it is possible to ensure that the temperature in upper chamber 36 is either substantially the same as that in the lower chamber (vent 44 closed, vent 46 open) or substantially different (warmer—vent 44 open). Alternatively, the cryogenic liquid can be discharged into the upper chamber 36, the tray 34 being formed of thermally-insulating material and substantially separating the upper and lower chambers 36, 38, so that the upper chamber 36 is maintained at a lower temperature (typically about −25° C.), whilst the lower chamber 38 is at ambient temperature or just below (0–4° C., say). The tray 34 can preferably be moved so as to vary the size of the upper chamber 36—with an equivalent variation in the size of the lower chamber 38—so as to accommodate different amounts of products requiring chilling to different temperatures. Although only a single tray 34 is shown, it will be understood that there could be provided two or more trays, so as to subdivide each compartment into three or more chambers, each of which could be maintained at a different refrigeration temperature.

Those skilled in the art will appreciate how the apparatus illustrated in FIGS. 2b and 2c could easily be modified so as to operate with conventional compressed gas cylinders, such as cylinders containing compressed carbon dioxide which is discharged into the various compartments/chambers via conventional "snow horn" devices.

While an embodiment of the present invention has been described in detail, it should be apparent that further modifications and adaptations of the invention will occur to those skilled in the art. It is to be expressly understood, however, that such modifications and adaptations are within the spirit and scope of the invention.

We claim:

1. An apparatus for refrigerating goods comprising: means for storing a cryogenic fluid; means for distributing the cryogenic fluid from the storage means; and means for containing the goods to be refrigerated, the containing means comprising:

a plurality of compartments, partitioning means disposed in each one of the plurality of compartments for providing upper and lower chambers in each compartment, said partitioning means constructed and arranged for fluid communication between the upper and lower chambers, discharge means disposed in each compartment and connected to the distribution means for discharging cryogenic fluid into a corresponding one of the plurality of compartments.

2. The apparatus according to claim 1 wherein the storing means comprises a liquid storage tank formed substantially of a foamed polymeric material.

3. The apparatus according to claim 1 wherein cryogenic fluid is delivered from the storing means to the discharge means by gravity.

4. The apparatus of claim 1 further comprising valve means disposed in the containing means for controlling the discharge of cryogenic fluid into the containing means.

5. The apparatus according to claim 1 wherein the discharge means are provided in the lower chamber of each one of the plurality of compartments.

6. The apparatus according to claim 5 further comprising means for venting cryogenic gas from the lower chambers.

7. The apparatus according to claim 1 further comprising eutectic material configured and disposed as a thermal buffer for the containing means.

8. The apparatus according to claim 1 wherein the containing means is adapted to be mounted to a vehicle for transporting refrigerated goods.

9. The apparatus according to claim 1 wherein the partitioning means comprises a tray.

10. The apparatus according to claim 9 wherein the tray is adjustably mountable in the compartment to adjust the sizes of the upper and lower chambers.

* * * * *